(12) United States Patent
Renteria

(10) Patent No.: US 7,257,874 B2
(45) Date of Patent: Aug. 21, 2007

(54) PROCESS FOR MANUFACTURING RING-TYPE METAL JOINTS FOR HIGH PRESSURE DUCTS

(75) Inventor: Armando Rimoldi Renteria, Queretaro (MX)

(73) Assignee: Servicios Condumex S.A. de CV, Queretaro (MX)

( * ) Notice: Subject to any disclaimer, the term of this patent is extended or adjusted under 35 U.S.C. 154(b) by 43 days.

(21) Appl. No.: 10/865,377

(22) Filed: Jun. 10, 2004

(65) Prior Publication Data

US 2005/0273993 A1   Dec. 15, 2005

(51) Int. Cl.
  *B23P 17/00* (2006.01)
  *B23P 13/04* (2006.01)
(52) U.S. Cl. .................. 29/417; 29/460; 29/525.14; 29/557
(58) Field of Classification Search ........... 29/890.122, 29/888.073, 888.071, 888.074, 888.3, 417, 29/460, 525.14, 557, 558
See application file for complete search history.

(56) References Cited

U.S. PATENT DOCUMENTS

| | | | | |
|---|---|---|---|---|
| 3,585,832 A | * | 6/1971 | Hinshaw et al. | 72/256 |
| 3,635,063 A | * | 1/1972 | Stern et al. | 72/130 |
| 3,660,192 A | * | 5/1972 | Smith et al. | 156/155 |
| 3,729,790 A | * | 5/1973 | Sugahara | 29/888.074 |
| 4,270,373 A | * | 6/1981 | Hirato et al. | 72/41 |
| 4,397,413 A | * | 8/1983 | Wagner et al. | 228/174 |

* cited by examiner

*Primary Examiner*—Jermie E. Cozart
(74) *Attorney, Agent, or Firm*—Carmen Pili Ekstrom

(57) ABSTRACT

Improved process for manufacturing ring-type metal joints for high pressure ducts, characterized because it presents the following steps: a) oval bar manufacturing and b) ring-type metal joints manufacturing, wherein the oval bar manufacturing comprises the following steps: submitting a round metal bar to a sharpening treatment before it is drawn through a die and forming the oval bar; cutting, rolling, and bending the oval bar and welding the profile; submitting the joint to an electrolytic coating treatment.

19 Claims, 5 Drawing Sheets

A

B

C

D

E

PRIOR ART

Raw Material: Round Bar

Coining (one end)

Back View

Front View

PROCESS FOR MANUFACTURING RING-TYPE METAL JOINTS FOR HIGH PRESSURE DUCTS

BACKGROUND OF THE INVENTION

Field of the Invention

The manufacturing of ring-type joints started with high pressure and high temperatures applications mainly for the oil industry in the drilling field and other termination equipments. Currently, they are also used in valve devices as well as pipes for high pressure containers requiring good integration.

Said joints are well known in the oil industry both in the production as well as in the refining stages. They are manufactured under the following standard: API specification 6A and ASME specification B16.20.

These joints are used in high pressure lines, both for high and low temperature, including sour gas and corrosive atmospheres. The surface finishing and the hardness are important factors for this type of joints which have to be softer than the flange material that is to contain them, in order to ensure an effective seal.

Different techniques are known to manufacture metal joints for high pressure ducts, for example, DAN-LOC and LAMDN'S joints in the USA and Francis B Will Mott LTD and FLEXITALLIC LTD in England.

Figure 3:
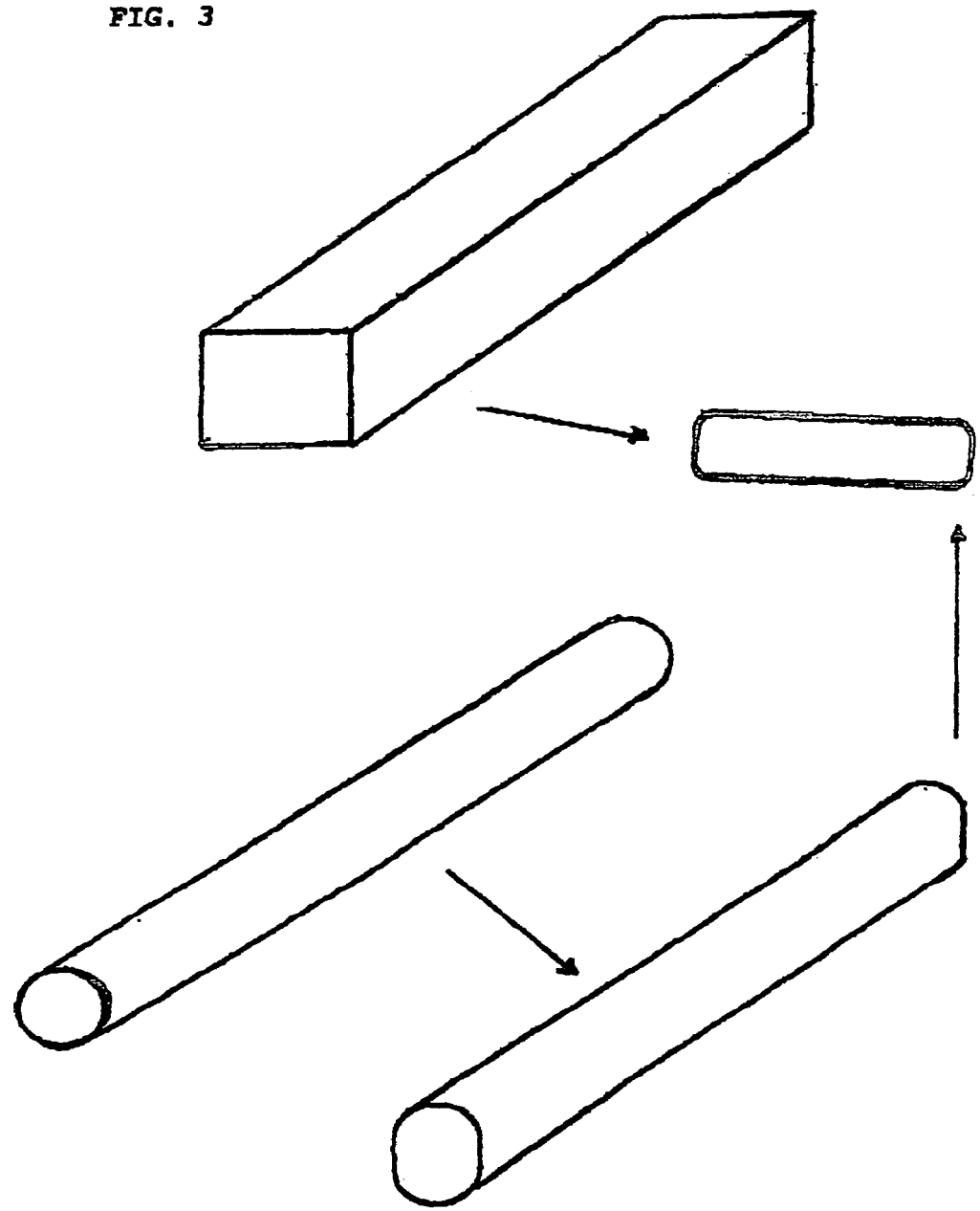
Figure 4:
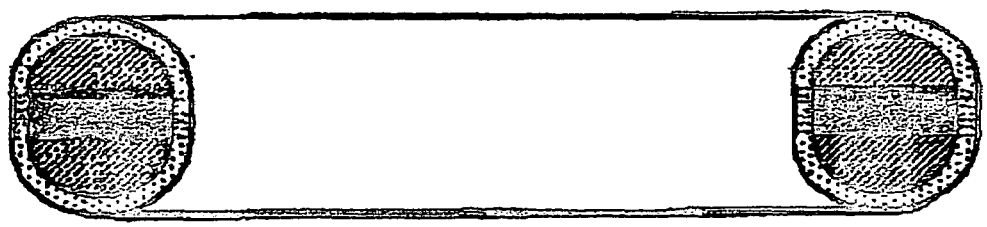
Figure 4:
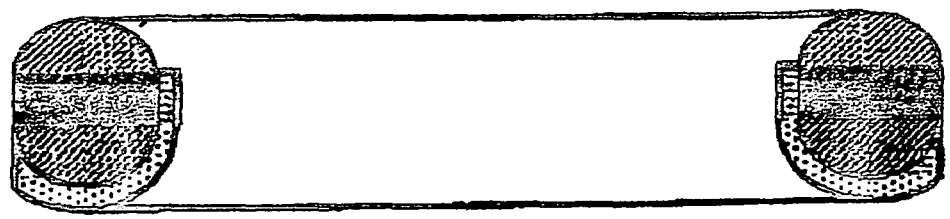
Figure 4:
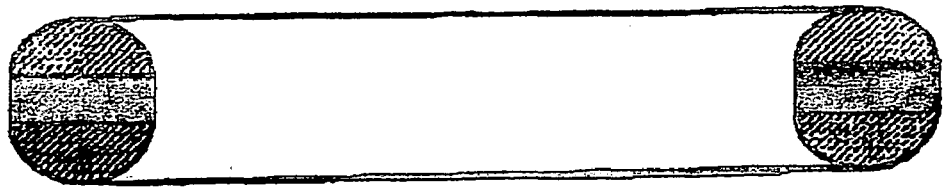
Figure 4A:
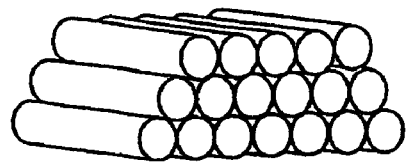
Figure 4A:
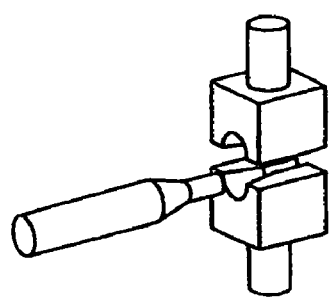
Figure 4A:
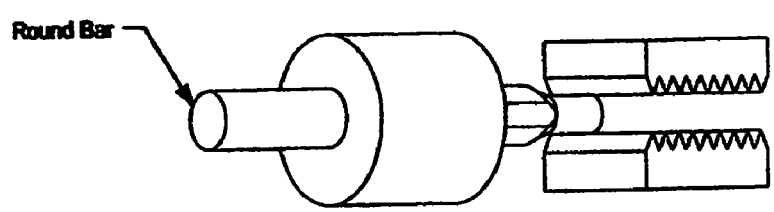
Figure 4A:
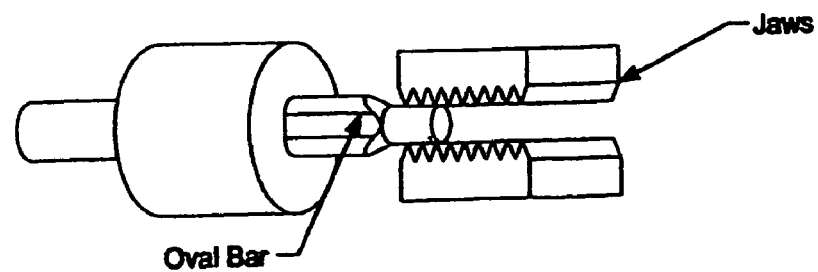

Practically, all conventional design of ring-type joints have the same oval shape, FIG. 4, and particularly, octagonal shape. When starting from a round bar, said bar is machined into an oval shape, FIG. 3, and if a square or rectangular bar is used, it is machined as well. In general, in all the cases, the same basic procedure is used, but the difference is the use of rectangular or square bar, FIG. 3, depending on the market availability, since the annual volume sales for some models, does not justify special manufacturing at the mill.

The disadvantages of the abovementioned process is that because it starts from a rectangular or square bar, FIG. 3, there is a lot of waste in the form of burr, the machining times are longer and there is a higher wear of the machine tools.

DESCRIPTION OF THE INVENTION

Hereinafter the preferred features of the instant invention are disclosed in the accompanying drawings of FIGS. 1 to 4.

Figure 1:
Figure 1:
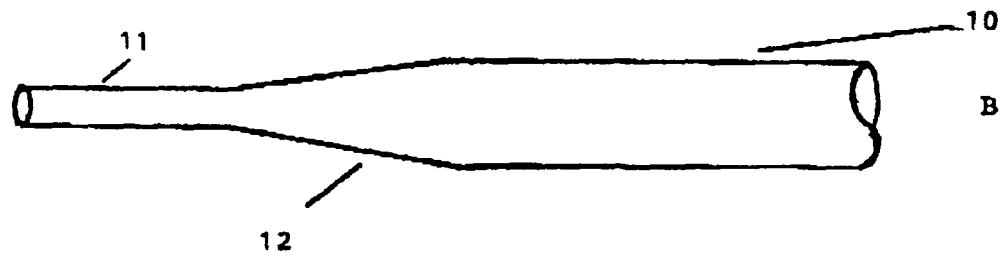
Figure 2:
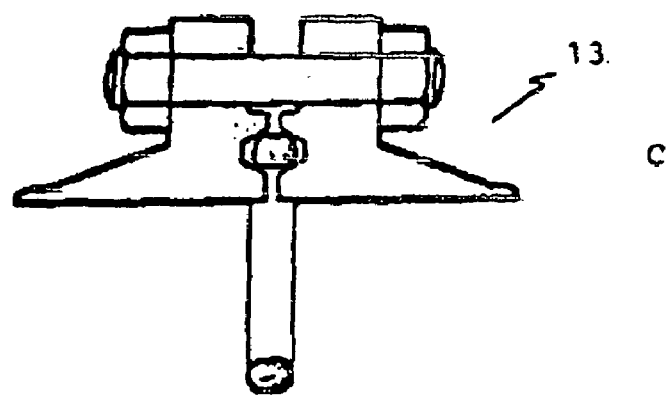
Figure 2:
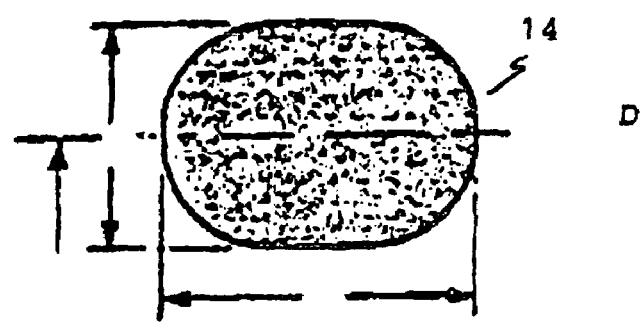
Figure 2:
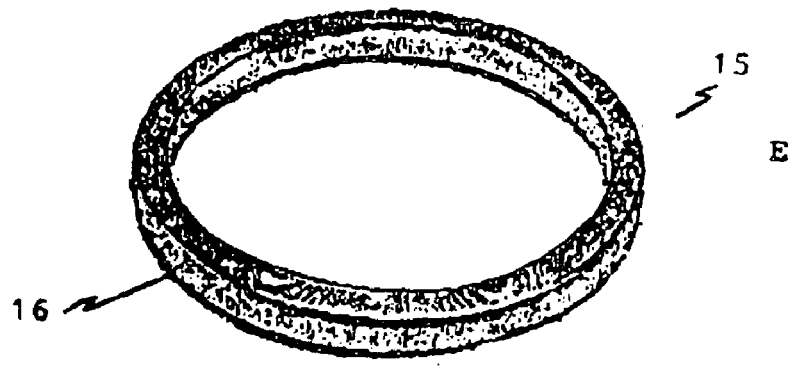

FIG. 1 corresponds to an isometric view of:
A) a commercial round bar
B) a round bar with sharpening process.
FIG. 2 corresponds to a front view
C) fixed forming die
D) cross section of an oval bar
E) isometric view of a ring-type joint.
FIG. 3 corresponds to a flow chart of the conventional manufacturing process of ring-type commercial joints.
FIG. 4 corresponds to a cross section view of the conventional machining of ring-type joints from an oval bar.

DESCRIPTION OF THE MACHINING OF THE OVAL BAR

The manufacturing process of the oval bar includes the following steps:
1) a commercially available, cold-drawn, "COLD ROLLED" type round bar 10, FIG. 1, is submitted to the following treatment:
2) sharpening 11, FIG. 1, which consists in reducing at an end of bar 11, FIG. 1, the diameter of said bar till about half said diameter and along a segment of about 20 to 21 cm (8 inches). For this purpose, it should be ensured that the transition zone between the two diameters 11 and 10, FIG. 1, present a cone shape 12, FIG. 1, up to 30°.
3) Once the sharpening is complete, the bar is lubricated and passes to a drawing train. p1 4) On the drawing train, in a forming die is placed 13, which is then fastened with the jaws of the drawing train, see FIG. 2C. Then, the bar 11 is pulled to pass through the forming die 13, FIG. 2C (cold forming the oval cross section) to form the oval bar 14, FIG. 2D, according to the sizes requested in the specifications. The process is also characterized because a bar that is longer than the original round bar 10 is obtained, this being the result of the absence of material loss during the drawing process.

DESCRIPTION OF THE PROCESS TO MANUFACTURE RING-TYPE METAL JOINTS

5) Once the oval bar is obtained, it is cut and rolled at the required length according to the model.
6) It is then bent to obtain the requested diameter according to the model.
7) It is welded through the Butt welding or Flash Welding known process.
8) It is machined to obtain the ring-type joint 15, FIG. 2E.
9) It is marked with identification legend 16, FIG. 2E, and
10) The welded and trimmed joint is submitted to an annealing process to eliminate residual stresses caused by the mechanical strain during the drawing, rolling and welding stages.
11) The joint is submitted to an electrolytic coating, according to the following processes:

| Coating | Process | Specifications |
| --- | --- | --- |
| Zinc | Galvanized | ASTM B 633 Specification for Zinc, Copper, Stainless Steel electrocoating |
| Cadmium | Cadminized | ASTM B 766 Standard specifications for Cadmium electrocoating |

According to API 6A Standard, said coating shall be at most 0.5 mils thick.

The main characteristic of this bar is that its cross section is oval and with sizes that are very similar to the final product. Thus, the advantages of the new techniques are as follows:

Advantages:
burr waste is reduced by 15 to 20% depending on the size to be machined.
machining time is reduced up to 25%, in some cases it is possible to avoid the trimming operation, conducting only the finishing step.
machine tool wear is reduced
more pieces are obtained for every ton of raw material.
because of the abovementioned advantages, a manufacturing cost reduction is obtained.

Materials:

The oval bar object of the instant invention can be manufactured with the following materials:
- mild steel
- low carbon steel
- stainless steels (304, 316, 321, 347, etc.)
- Nickel alloys (Monel, Inconel, Incoly, Hasteloy, etc.)
- Titanium and its alloys As raw material, preferably, the rounded "COLD ROLLED" bar is manufactured of any of the following qualities, if they meet the maximum hardness requirement.

| Alloy | % C | % Mn | % P | % S | Mechanical Hardness |
|---|---|---|---|---|---|
| 1008 | 0.10 Max | 0.30-0.50 | 0.040 | 0.050 | 90 Brinell |
| 1010 | 0.08-0.13 | 0.30-0.60 | 0.040 | 0.050 | 120 Brinell |
| 1012 | 0.10-0.13 | 0.30-0.60 | 0.040 | 0.050 | 120 Brinell |

Sizes:

Currently, the following sizes are manufactured:
5/8"×7/18"
1/3"×1"
3/4"×1"

but other sizes and other profile types can be manufactured, if required.

The foregoing is considered as illustrative only of the principles of the invention. Further, since numerous modifications and changes will regularly occur to those skilled in the art, it is not desired to limit the invention to the exact construction operation shown and described, and accordingly, all suitable modifications and equivalents may be resorted to, falling within the scope of the invention.

The invention claimed is:

1. An improved process for manufacturing ring-type metal joints for high pressure ducts or valves and pipelines for high pressure containers, comprising the following steps:
    a) machining an oval bar, from a round metal bar having cold drawing properties;
    b) sharpening one end of the round metal bar until the diameter of said end is about half of its original diameter to form a sharpened bar and insuring that the transition zone between the two diameters of the metal bar maintains a cone shape of up to 30°;
    c) lubricating the resulting sharpened bar;
    d) subjecting the sharpened bar in a drawing train comprising train jaws wherein the bar is cold drawn through an oval shaped forming die, such that a trimmed end is fastened by the train jaws during pulling of the round bar to form an oval cross section;
    e) cutting the oval bar into a plurality of oval segments and rolling the oval bar at a required length;
    f) machining the ends of oval segments through ring bending according to the desired diameter of the joints;
    g) welding the joints which unite to form a ends to form ring joints through methods selected from the group consisting of butt welding and flash welding; and
    h) machining the joint to obtain a ring-type joint; and marking the ring type joint.

2. The improved process for manufacturing ring-type metal joints for high pressure ducts according to claim 1, further comprising annealing the ring joint at a temperature of 750° C.

3. The improved process for manufacturing ring-type metal joints for high pressure ducts according to claim 2, further comprising coating the ring joint electrolytically.

4. The improved process for manufacturing ring-type metal joints for high pressure ducts, according to claim 2, wherein the annealing step is conducted to eliminate residual stresses caused by the mechanical strain during the drawing, rolling and welding steps.

5. The improved process for manufacturing ring-type metal joints for high pressure ducts according to claim 3 wherein the electrolytic coating process is selected from the group consisting of galvanizing and cadminizing.

6. The improved process for manufacturing ring-type metal joints for high pressure ducts according to claim 5 wherein the electrolytic coating is conducted at a maximum thickness of about 0.0127 mm.

7. The improved process for manufacturing ring-type metal joints for high pressure ducts, according to claim 5, wherein the galvanizing is conducted by coating with metals selected from the group consisting of zinc, copper or combinations thereof.

8. The improved process for manufacturing ring-type metal joints for high pressure ducts, according to claim 5, wherein the electrolytic coating is at most 0.5 mils thick.

9. The improved process for manufacturing ring-type metal joints for high pressure ducts according to claim 1, wherein the sharpening step comprises reducing one of the ends of the rounded bar at about half of its diameter and along a segment of 20 to 21 cm length.

10. The improved process for manufacturing ring-type metal joints for high pressure ducts according to claim 1, wherein the length of the oval bar increases with regard to the original length of the round bar, such that the drawing process prevents material loss and offers an oval cross section with sizes which are very similar to a required final product.

11. The improved process for manufacturing ring-type metal joints for high pressure ducts according to claim 1 wherein the material of the bar is selected from the group consisting of mild steel, low carbon steel, stainless steel (304, 316, 321 or 347), nickel alloy, titanium and alloys and combinations thereof.

12. The improved process for manufacturing ring-type metal joints for high pressure ducts, according to claim 1 wherein the joints are about 0.0127 mm thick.

13. The improved process for manufacturing ring-type metal joints for high pressure ducts, according to claim 1 wherein burr waste is reduced by about 15 to 20%.

14. The improved process for manufacturing ring-type metal joints for high pressure ducts, according to claim 1 wherein machining time is reduced by up to 25%.

15. The improved process for manufacturing ring-type metal joints for high pressure ducts, according to claim 1 wherein the round bar has maximum mechanical hardness of about 90-120 Brinell.

16. The improved process for manufacturing ring-type metal joints for high pressure ducts, according to claim 1 wherein the round bar comprises an alloy having 0.08-0.013% C, 0.30-0.60% Mn, 0.040% P and 0.050% S.

17. An improved process for manufacturing ring-type metal joints for high pressure ducts or valves and pipelines for high pressure containers, comprising the following steps:
    a) oval bar manufacturing; and
    b) ring type metal joint manufacturing;
    said process comprising:

a) sharpening one end of a round metal bar comprising trimming the bar until the diameter of said end is about half of its original diameter and insuring that the transition zone between the two diameters of the metal bar maintains a cone shape of up to 30°;
b) lubricating the resulting sharpened bar;
c) subjecting the sharpened bar into a drawing train comprising train jaws wherein the bar passes by cold drawing through an oval shaped forming die;
d) trimming the ends of end of the round metal bar by fastening the bar through the train jaws of drawing train and pulling the round bar to form an oval cross section;
e) cutting the oval bar in a plurality of oval segments and rolling the oval bar at a required length;
f) machining the oval segments through ring bending according to the desired diameter of the joints;
g) welding the joints which unite to form a ends to form Ring joints through methods selected from the group consisting of butt welding and flash welding;
h) machining the joint to obtain a ring-type joint; and marking the ring type joint;
i) annealing the ring joint at a temperature of 750° C.; and
j) coating the ring joint electrolytically.

18. The improved process for manufacturing ring-type metal joints for high pressure ducts according to claim 17 wherein the electrolytic coating process is selected from the group consisting of galvanizing and cadminizing.

19. The improved process for manufacturing ring-type metal joints for high pressure ducts according to claim 18 wherein the electrolytic coating is conducted at a maximum thickness of about 0.0127 mm.

* * * * *